(No Model.)
C. A. FOWLER.
SETTING FOR JEWELRY, &c.
No. 300,459. Patented June 17, 1884.
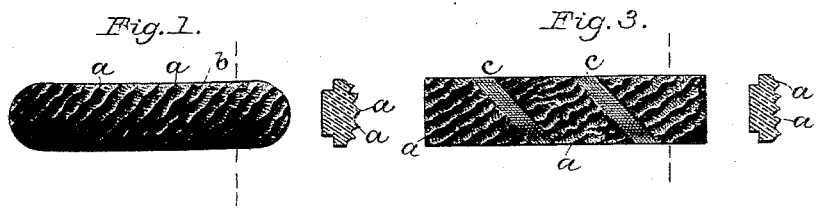
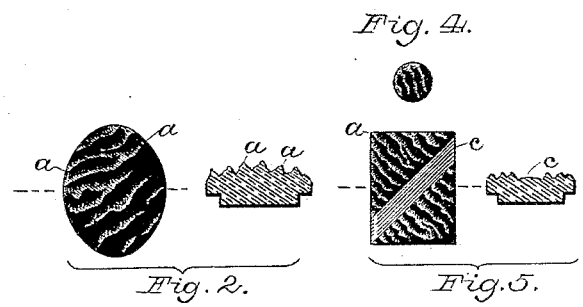
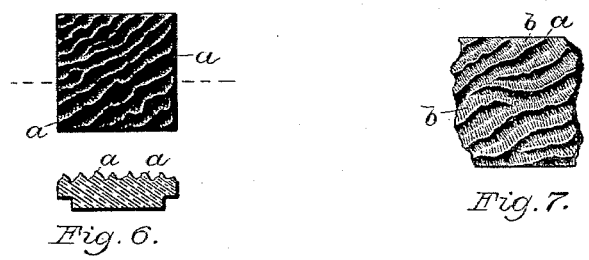
Attest:
Philip F. Larner.
Lowell Bartle.
Inventor:
Charles A. Fowler.
By Wm. C. Wood
Attorney.

UNITED STATES PATENT OFFICE.

CHARLES A. FOWLER, OF NEW YORK, N. Y.

SETTING FOR JEWELRY, &c.

SPECIFICATION forming part of Letters Patent No. 300,459, dated June 17, 1884.

Application filed March 6, 1884. (No model.)

*To all whom it may concern:*

Be it known that I, CHARLES A. FOWLER, of the city and county of New York, in the State of New York, have invented certain new and useful Improvements in Settings for Jewelry and Similar Articles; and I do hereby declare that the following specification, taken in connection with the drawings furnished and forming a part thereof, is a clear, true, and complete description of my invention.

Settings embodying my invention constitute a new article of manufacture radically unlike any prior settings of which I have cognizance, and they are readily distinguishable therefrom. They are susceptible of use in connection with many lines of goods, including breast-pins, ear-rings, shawl-pins, clasps, buttons, buckles, &c. My novel settings may be included with those general classes which embrace opaque stones and the various imitations thereof; but having reference to profit alone, they have their greatest value in connection with the manufacture of comparatively cheap goods, wherein imitations of stone or jet are desirable.

The object of my invention is to impart to settings, whether of stone or of jet or imitations thereof, certain strikingly novel effects, which, as I believe, have never before been obtained, and more especially to cause them to resemble a certain variety of textile fabric commonly known as "English crape," although not limited to any special color; and my invention consists in a setting composed of stone, glass, or other imitative friable material or compound having a practically lusterless surface, and in whole or in part covered with practically parallel corrugations, with or without being also laterally scored in fine and practically parallel lines.

To more particularly describe my invention I will refer to the accompanying drawings, in which Figure 1 illustrates in front view and in cross-section one of my novel settings as made by me for use in a bar-pin. Fig. 2 illustrates in front view and in cross-section one of my settings as for use in an ear-ring or button. Figs. 3, 4, and 5 illustrate in similar views a set of settings as for use in a bar-pin and ear-rings. Fig. 6 illustrates in similar views a setting as for use in a clasp or buckle or breast-pin. Fig. 7 is an enlarged view of a portion of the central part of the setting, Fig. 3.

In each of the illustrations, $a$ denotes one of many corrugations arranged in series side by side, and embracing either the entire surface of the setting, as seen in Figs. 1, 2, 4, and 6, or grouped in portions or divisions thereof, as seen in Figs. 3 and 5. Said corrugations, as seen in Fig. 1, may be practically straight, and either longitudinal, lateral, or diagonal, as shown; or they may be in waved lines, as in Fig. 6; or, as in Fig. 3, both varieties of lines may be intermingled or employed in separate sections. In all cases said corrugations constitute an essential feature in the construction of my settings; and as another feature for obtaining the best results said corrugations are more or less regularly scored laterally with the finer cross-lines or corrugations $b$, which are also practically parallel. Whether the fine cross-lines are employed or not, it is an essential feature of my invention that the corrugated surface of the setting be practically lusterless, or, in other words, have a "dead finish" practically incapable of reflecting light.

So far as relates to novelty in my settings, it is wholly immaterial by what process or processes the main and the subordinate or auxiliary corrugations are developed, it being obvious that they must vary according to the character of the materials employed in their production—as, for instance, if onyx or other natural solid stone be used, the said corrugations must be developed by cutting operations, whether by the use of tools, abrasive matter, or corrosive acids. If glass or silicious compounds, with mineral or metal fluxes, be employed, or compounds containing flinty gums, of which shellac and sandrac are familiar types, or simple natural bodies—such as cannel-coal—all of which are well known to be capable of being reduced to a semi-plastic or plastic condition, my settings are produced in molds or dies, in which the general form of the setting is provided for, as well as the main and the auxiliary corrugations $a$ and $b$, all in an obvious and well-known manner, and as practiced for producing settings of other kinds.

The material, having been first made plastic by heat, resumes, when cooled in a die, its normal hard and friable characteristics.

However, my settings as thus far described may have been produced, they must, as an essential feature thereof, possess, as hereinbefore stated, a practically lusterless surface, and this is also variably provided for according to the materials employed or the particular method by which the corrugations may have been developed—as, for instance, if it be a solid-stone setting, the cutting-tools, or the abrasive matter, or the corrosive acids (if either or all be employed for developing the corrugations) will in each instance, as a rule, develop a lusterless surface; but in order that said surface shall be uniform in its character I subject it evenly to the action of the corrosive acids.

In the case of glass or other silicious material, it is obvious that the necessarily finely-finished surfaces of the molds or dies will impart to the glass a correspondingly brilliant or light-reflecting surface, and the settings so formed are therefore subjected by me to the action of corrosive acids—such as fluoric acid— by which the surface is rendered lusterless.

As seen in Figs. 3 and 5, it is sometimes desirable that certain portions of a setting have a glossy polished or light-reflecting surface, as indicated at the bands c, and these are provided for in a manner well known by applying resistants—such as a film of beeswax or varnish—at those points on the surface to protect them from the action of the acid while in the bath.

If the settings be composed of bog or cannel-coal, or of compounds embodying flinty adhesive gums—such as shellac, sandrac, or even glue, &c.—their surfaces will (if not prevented) partake of the polished character of the molds or dies, and it is obvious that corrosive acids cannot be generally relied upon in the treatment of such settings for rendering them lusterless, because of the liability in some cases of the undue destructive action thereof, as well as in other cases to the presence of gummy matters in themselves capable of resistance to the acid, and therefore other means must be employed—as, for instance, I first coat the interior of the molds with a film of carbon—say in the form of lamp-black—applied by exposure to a lighted candle, or by lightly dusting the mold with an impalpable powder of any material corresponding in color with the materials of which the settings are composed.

It is obviously immaterial under my invention how the settings are constructed with reference to their convenient application to the other portions of articles in which they are or may be employed, although I have in each case illustrated a rabbeted back for enabling them to be entered and secured in the usual way in a chambered plate; but it is to be understood that in the molded varieties a stem, stub, or frame of any desired form, composed of metal, may be embedded into the setting during the molding operation in a manner not new with other types of molded settings, whereby they may be securely attached to the articles of which they are to be made a part.

My novel settings may be produced in various colors, and each may be composed of apparent or actual sections in different colors, it being obvious that these variations involve no departure from my invention.

Having thus described my invention, I claim as new and desire to secure by Letters Patent—

As a new article of manufacture, a setting for jewelry, buttons, and similar goods, substantially as hereinbefore described, the same being composed of stone, glass, or other friable materials or compounds having a practically lusterless surface, and in whole or in part covered with practically parallel corrugations.

CHARLES A. FOWLER.

Witnesses:
PHILIP F. LARNER,
HOWELL BARTLE.